J. A. B. Patterson,
Plow Cleaner.
No. 89,237. Patented Apr. 20, 1869.
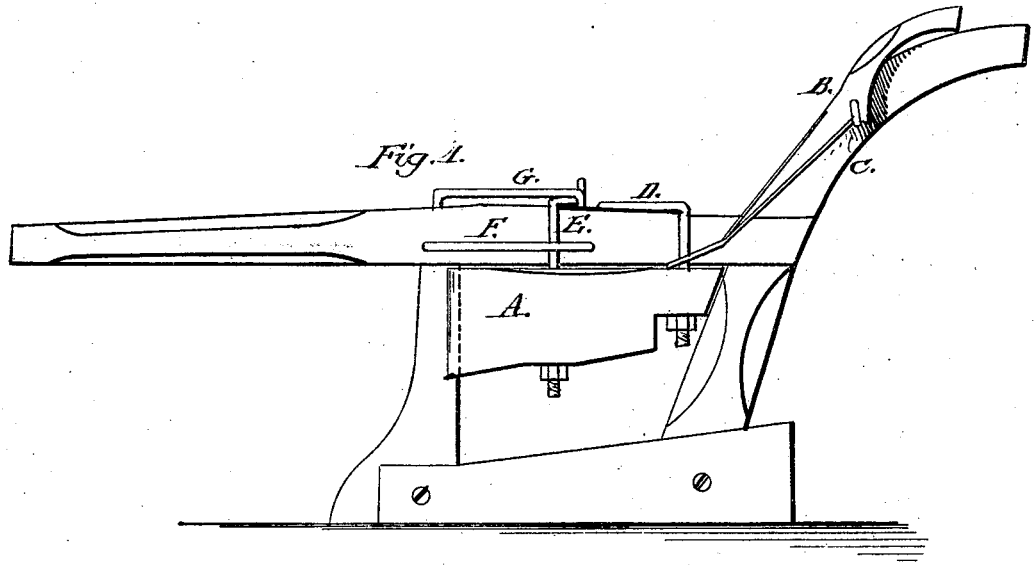
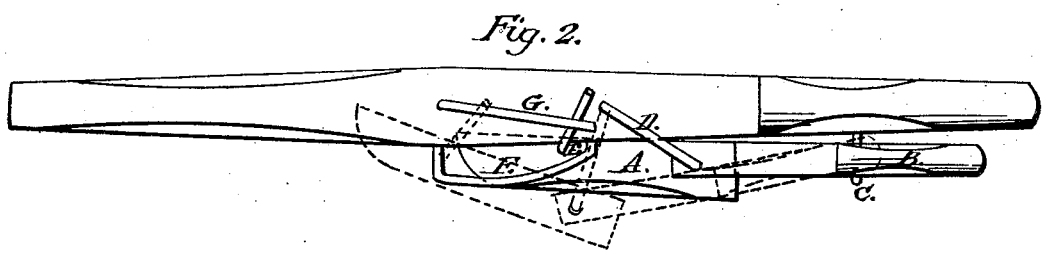
Witnesses:
Inventor:
Jas. A. B. Patterson

JAMES A. B. PATTERSON, OF SPRINGFIELD, ILLINOIS.

Letters Patent No. 89,237, dated April 20, 1869.

IMPROVEMENT IN PLOW-CLEANERS

The Schedule referred to in these Letters Patent and making part of the same.

*To all whom it may concern:*

Be it known that I, JAMES A. B. PATTERSON, of Springfield, in the county of Sangamon, and in the State of Illinois, have invented a new and useful Plow-Cleaner; and do hereby declare that the following is a full, clear, and exact description thereof, reference being had to the accompanying drawing, making a part of this specification, in which—

Figure 1 is a side elevation of a plow with the cleaner attached, and

Figure 2 is a plan view of the same.

Like letters denote like parts in each figure.

This device is used for cleaning plows, and other agricultural implements in which plows are employed, from earth, grass, weeds, or other impediments, which cling to the coulter and mould-board, and prevent easy passage through the soil.

It substitutes for the usual and slow method of cleaning plows by hand, by a stick, or by the foot, stopping the team for the purpose, a device enabling the plowman, while the team is in motion, by the use of a lever convenient to his hand, to push a cleaner along the front of the coulter and mould-board, and clear them from all obstructing matter.

This invention is more particularly described as follows, viz:

The cleaner, A, is attached to the landside of a plow, and when not in use is directly under the plow-beam, with its front just behind the front of the coulter, its rear against the back standard of the plow, and its side close to the side of the plow.

It is of a general oblong form, with a straight up-and-down front edge, of suitable dimensions, shape, and material, and adjustable by means of a lever, B, which lies in position by the side of the plow-beam, and at its outer end is engaged by a notch on its under side upon a hook, C, in said plow-handle, and at its inner end plays upon a pivot bar, D.

This pivot bar is a rod which passes upward through the rear end of cleaner A, from its bottom, where it is secured by a nut, and bends at right angles over the plow-beam, and close to it, and again bends at right angles downward, and passes through the centre of said beam, being movable both in said beam and in said cleaner.

The front end of cleaner A is also attached to the plow-beam by a pivot bar, E, which is a rod passing up through said cleaner from the bottom, where it is secured by a nut and washer, and then through a guide, F, on the side of said beam, and, bending at right angles, passes under a guide, G, upon the top of said beam, and then turns upward, so as to be kept from withdrawal by said guide G.

Pivot bar D is so much longer between its two bends than pivot bar E, that when cleaner A is pushed forward, its rear end is thrown outward, while the front end is pressed against the plow, and, by means of the guides F and G, scrapes along it and across the front of the coulter and mould-board.

To use this device, the plowman disengages lever B, and pushes it forward, which moves cleaner A along and over the front edge of the coulter and mould-board, thoroughly removing and scraping off all obstructions, and then drawing the lever B back, it engages itself upon hook C, leaving said cleaner in place and secure.

This device is cheap, simple, and easily constructed, and may be applied to any plow in use by any ordinary mechanic, is not liable to get out of order, is easily repaired, and very durable.

What I claim as my invention, and desire to secure by Letters Patent, is—

1. The above-described device for cleaning plows, consisting of the cleaner A, connected with and suspended from the beam of a plow by the pivot bars D and E, and the guides F and G, and operated by means of the lever B, substantially as and for the purposes before set forth.

2. Also, the pivot bars D and E, in combination with the guides F and G, connecting and suspending the cleaner A to the beam of a plow, substantially as shown and for the purpose described.

In testimony that I claim the foregoing, I have hereunto set my hand, this 11th day of March, 1869.

J. A. B. PATTERSON.

Witnesses:
GEO. O. MARCY,
ALEX. BROWN.